United States Patent
Brunner et al.

(10) Patent No.: US 9,625,094 B2
(45) Date of Patent: Apr. 18, 2017

(54) OPERATING METHOD FOR A CRYO-COMPRESSED TANK

(75) Inventors: Tobias Brunner, Unterhaching (DE); Thomas Hagler, Munich (DE); Sylvain Bastian, Munich (DE); Klaus Szoucsek, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1432 days.

(21) Appl. No.: 12/792,331

(22) Filed: Jun. 2, 2010

(65) Prior Publication Data

US 2010/0236259 A1    Sep. 23, 2010

Related U.S. Application Data

(63) Continuation of application No. PCT/EP2008/009890, filed on Nov. 21, 2008.

(30) Foreign Application Priority Data

Dec. 3, 2007    (DE) .................... 10 2007 057 978

(51) Int. Cl.
*F17C 7/04*    (2006.01)
*F17C 1/00*    (2006.01)

(52) U.S. Cl.
CPC ........ *F17C 1/00* (2013.01); *F17C 2201/0109* (2013.01); *F17C 2201/0166* (2013.01);
(Continued)

(58) Field of Classification Search
USPC .................................... 62/45.1, 50.2
See application file for complete search history.

(56) References Cited

U.S. PATENT DOCUMENTS 3,360,948 A * 1/1968 Perry ............................. 62/45.1
3,800,550 A * 4/1974 Delahunty ..................... 62/47.1
(Continued)

FOREIGN PATENT DOCUMENTS

DE    539 336 A    11/1931
DE    70 07 330 U    1/1972
(Continued)

OTHER PUBLICATIONS

German Search Report dated Sep. 12, 2008 with English translation (nine (9) pages).
(Continued)

*Primary Examiner* — Christopher R Zerphey
(74) *Attorney, Agent, or Firm* — Crowell & Moring LLP

(57) ABSTRACT

An operating method is provided for a cryo-compressed tank for supplying cryogenic hydrogen to a consumer of a motor vehicle under supercritical pressure at 13 bar or more. In order to compensate for pressure loss resulting from hydrogen removal, the removed hydrogen that has been heated in a heat exchanger is conveyed to a heat exchanger, provided in the cryo-compressed tank, by way of a tank pressure regulating valve and a branch line, which branches off of a supply line leading to the consumer. After flowing through the heat exchanger, it is introduced into the supply line downstream of the branching off of the branch line. Over a period of time that significantly exceeds the cycle times of a conventional frequency valve, either the removed amount of hydrogen is guided without limitation into the heat exchanger, provided in the cryo-compressed tank, the tank pressure regulating valve being completely open, or no return of the heated hydrogen into the heat exchanger occurs at all. Downstream of the branching off of the branch line, the supply line has a pressure regulating unit, which ensures that irrespective of the changes in the pressure in the supply (Continued)

line caused upstream of the pressure regulating unit by switching the tank pressure regulating valve, a sufficient and continuous supply of hydrogen to the consumer at the pressure required is guaranteed.

4 Claims, 2 Drawing Sheets

(52) U.S. Cl.
CPC .. *F17C 2201/035* (2013.01); *F17C 2201/056* (2013.01); *F17C 2203/0391* (2013.01); *F17C 2203/0629* (2013.01); *F17C 2205/0149* (2013.01); *F17C 2205/0323* (2013.01); *F17C 2221/012* (2013.01); *F17C 2223/0161* (2013.01); *F17C 2223/035* (2013.01); *F17C 2223/036* (2013.01); *F17C 2227/0379* (2013.01); *F17C 2227/0383* (2013.01); *F17C 2260/011* (2013.01); *F17C 2260/033* (2013.01); *F17C 2270/0184* (2013.01); *Y02E 60/321* (2013.01)

(56) References Cited

U.S. PATENT DOCUMENTS

| | | | | | |
|---|---|---|---|---|---|
| 3,827,246 | A | * | 8/1974 | Moen et al. | 62/47.1 |
| 5,357,758 | A | * | 10/1994 | Andonian | 62/45.1 |
| 5,373,700 | A | * | 12/1994 | McIntosh | 62/48.1 |
| 5,421,162 | A | * | 6/1995 | Gustafson et al. | 62/7 |
| 5,467,603 | A | * | 11/1995 | Lehman et al. | 62/50.2 |
| 6,336,332 | B1 | * | 1/2002 | Cohu | 62/50.2 |
| 6,505,469 | B1 | | 1/2003 | Drube et al. | |
| 6,634,178 | B1 | * | 10/2003 | Michel et al. | 62/47.1 |
| 6,708,502 | B1 | | 3/2004 | Aceves et al. | |
| 7,201,002 | B1 | | 4/2007 | Brown | |
| 8,113,006 | B2 | * | 2/2012 | Rech | F17C 7/02 62/50.1 |
| 2005/0183425 | A1 | * | 8/2005 | Immel | 62/47.1 |
| 2007/0277533 | A1 | | 12/2007 | Rech et al. | |
| 2009/0308083 | A1 | | 12/2009 | Brunner | |

FOREIGN PATENT DOCUMENTS

| | | |
|---|---|---|
| DE | 43 20 556 A1 | 12/1994 |
| DE | 199 34 457 A1 | 2/2001 |
| DE | 10 2006 025 656 A1 | 12/2007 |
| DE | 10 2007 011 530 A1 | 9/2008 |
| DE | 10 2007 011 742 A1 | 9/2008 |

OTHER PUBLICATIONS

International Search Report dated Mar. 19, 2009 with English translation (six (6) pages).

* cited by examiner

OPERATING METHOD FOR A CRYO-COMPRESSED TANK

CROSS-REFERENCE TO RELATED APPLICATIONS

This application is a continuation of PCT International Application No. PCT/EP2008/009890, filed. Nov. 21, 2008, which claims priority under 35 U.S.C. §119 from German Patent Application No. DE 10 2007 057 978.2, filed Dec. 3, 2007, the entire disclosures of which are herein expressly incorporated by reference.

BACKGROUND AND SUMMARY OF THE INVENTION

The invention relates to an operating method for a cryo-compressed tank, in which may be stored the cryogenic hydrogen for supplying a consumer, in particular an internal combustion engine and/or a fuel cell of a motor vehicle under supercritical pressure at 13 bar or more. In this case, in order to compensate for the loss of pressure resulting from the removal of hydrogen from the cryo-compressed tank, the removed hydrogen that has been heated in a heat exchanger is conveyed to a heat exchanger, provided in the cryo-compressed tank, by way of a tank pressure regulating valve and a branch line, which branches off of a supply line leading to the consumer, and, after flowing through the heat exchanger, is introduced into the supply line downstream of the branching off of the branch line. With respect to the known prior art, reference is made especially to the German patent applications 10 2007 011 530.1 (having U.S. counterpart application Ser. No. 12/546,998, filed Aug. 25, 2009) and 10 2007 011 742.8, which were not published earlier. In addition, reference is also made to the U.S. Pat. No. 6,708,502 B1 and to the technology applied in the "hydrogen 7" vehicle of the assignee of the present patent application.

The known prior art in the so-called "hydrogen 7" vehicle, which is equipped with a so-called cryo tank for storing cryogenic hydrogen (for supplying the vehicle drive unit, configured as an internal combustion engine), is a "sub-critical" storage vessel (as the cryo tank), which consists of a metal inner tank, a metal outer tank, and a vacuum super insulation, which is sandwiched between the two tanks and which serves to reduce the introduction of heat into the inner tank. The typical operating pressure of this storage vessel ranges from 1 bar absolute to 10 bar absolute, and the operating temperatures in the so-called "standard cryogenic operation" range from 20 K (Kelvin) to approximately 30 K. That is, the cryogenic hydrogen, contained in the storage vessel and/or in the inner tank of the same, exhibits these physical values, which lie in the so-called sub-critical range in the pressure-density diagram of the hydrogen.

The so-called cryo-compressed storage system represents an additional known prior art, for which reason reference is made to the aforementioned U.S. Pat. No. 6,708,502 B1, which describes different types of insulated compressed storage systems for cryogenic storage mediums with inner and outer diffusion barriers, which envelop an inner tank made of carbon fiber reinforced plastic. According to this prior art, the described so-called cryo-compressed storage system can be filled with warm pressurized gas at 350 bar and at low storage capacity or as an alternative with liquid hydrogen at low pressure of approximately 1 bar (absolute) at higher storage capacity.

The two German patent applications, which were not published earlier and are described above, disclose that in a so-called cryo-compressed tank, which can be designed like the cryo-compressed storage system described in the previous paragraph, supercooled cryogenic hydrogen is stored under supercritical pressure, that is, at least at 13 bar absolute, or at a significantly higher pressure, that is, at 150 bar or more, and/or during filling of the tank, such hydrogen can be filled into a suitable cryo-compressed tank under supercritical pressure. With respect to the significant advantages of this technology, in particular at relatively high pressure values, reference is made to the statements made in the cited documents that have not been published earlier.

It may be desirable to be able to remove the hydrogen for supplying the consumer at a certain minimum pressure level. In the aforementioned "hydrogen 7" vehicle, this minimum pressure level in the tank is set by way of a targeted introduction of heat into the cryo tank. This heat input is achieved in that after a sub quantity of the hydrogen, removed from the tank, has been heated in an external heat exchanger, it is conveyed as the heat carrying medium through an (internal) heat exchanger, provided in the cryo tank. At the same time heat is dissipated to the hydrogen stored in the cryo tank. After flowing through this internal heat exchanger, the heat carrying hydrogen is returned again to the supply line leading to the consumer. Since the maximum pressure, which may prevail in this known cryo tank, is relatively low, only a continuously adjusted sub-quantity of the removed hydrogen, which was heated in an external heat exchanger, may be fed as the heat carrying medium to the (internal) heat exchanger, provided in the cryo tank. Thus, for an adjusted throttling and/or metering of the quantity of heat carrying medium, there is a tank pressure regulating valve, which is actuated as a function of the internal pressure of the cryo tank. However, a suitable continuous actuation of this regulating valve is relatively expensive.

For a cryo-compressed tank, in which the cryogenic hydrogen can be stored at absolute pressure values in a magnitude of 13 bar or more—that is, up to, for example, 350 bar, as mentioned in the above described U.S. Pat. No. 6,708,502 B1, the object is to provide an operating method that is simpler than that described in said prior art.

The solution to this problem is characterized in that over a period of time that significantly exceeds the cycle times of a conventional frequency valve, either the removed amount of hydrogen, which has been heated, is guided without limitation into the heat exchanger, provided in the cryo-compressed tank, the tank pressure regulating valve being completely open, or no return of the heated hydrogen into the heat exchanger, provided in the cryo-compressed tank, occurs at all; and that downstream of the branching off of the branch line, the supply line has a pressure regulating unit, which ensures that irrespective of the changes in the pressure in the supply line caused upstream of this pressure regulating unit by switching the tank pressure regulating valve, a sufficient and continuous supply of hydrogen to the consumer at the pressure required is guaranteed.

Aware of the fact that a cryo-compressed tank, which allows internal pressure values in a magnitude of 150 bar and more (for example, the cited 350 bar), permits far greater fluctuations in the internal pressure of the tank than, for example, a cryo tank of the above described "hydrogen 7" vehicle, the invention proposes, instead of the known expensive control element of the tank internal pressure for the tank pressure regulating valve, provided to this end, a simple so-called "black and white operating mode" with long cycle times, to the effect that this tank pressure regulating valve, which continues to be actuated as a function of the internal pressure in the cryo-compressed tank, is alternatingly either totally closed or totally open over a relatively long period of time, which significantly exceeds the typical cycle times of a conventional frequency valve. Therefore, the range of the tank pressure threshold values of a control element, which actuates the tank pressure regulating valve, that is, opens and/or closes said valve, must be set correspondingly wide. It has been recognized that the pressure fluctuations, which are automatically larger and/or relatively large with such a control strategy and which occur in a supply line conveying the hydrogen taken from the tank, can be tolerated, if downstream of the branching off of the branch line from the supply line, this supply line has a pressure regulating unit, as stated above.

In particular, it has been recognized that if the cryo-compressed tank is filled just partially to a significant extent at a so-called partial filling degree, for example, is filled up to half or filled less than 30%, then the tank pressure regulating valve can remain continuously open, especially if chronologically thereafter the pressure value in the cryo-compressed tank rises. This pressure value exceeds an upper threshold value, cited in the previous paragraph, for the actuation of the tank pressure regulating valve, in more concise terms, for closing this valve. It was recognized that beyond a certain system-specific partial filling degree despite the continuously open tank pressure regulating valve and, thus, noteworthy introduction of heat by way of the internal heat exchanger into the tank itself, even an additional, not completely avoidable heat input by way of the insulation of the tank can not produce a critical pressure increase in the cryo-compressed tank that could exceed a design specific limit value for the internal pressure of the tank. Then a large amount of heat is introduced by way of the continuously open tank pressure regulating valve into the cryo-compressed tank such that a prolonged supply of hydrogen to the consumer at the required higher pressure is possible than if on reaching this system specific partial filling degree the tank pressure regulating valve does not remain continuously open, that is, not for a prolonged period of time. The latter and/or the correspondingly proposed control strategy that serves to actuate the tank pressure regulating valve is referred to below as a reserve control and is explained below with reference to the accompanying FIG. 2.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
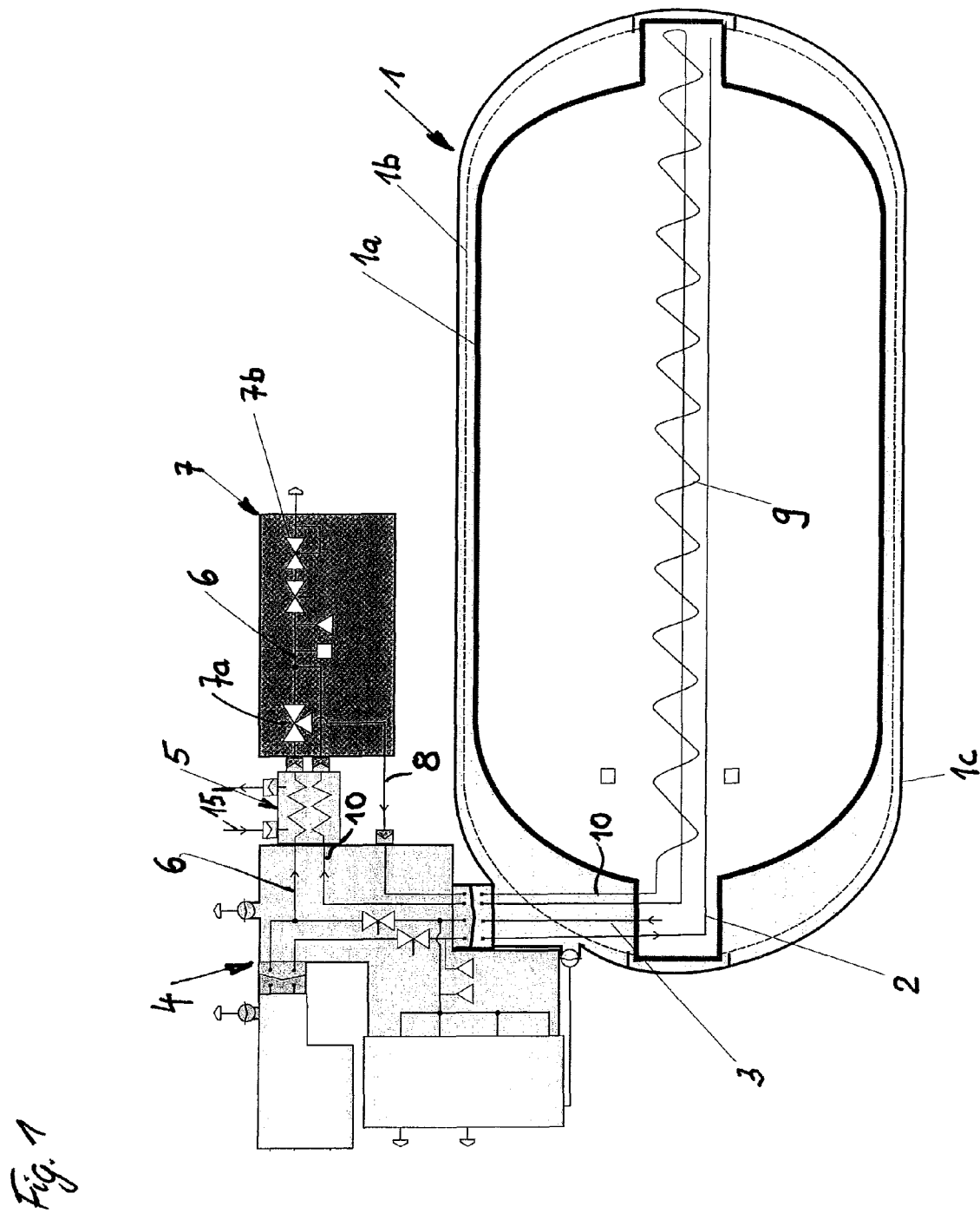
FIG. 1 is a schematic diagram showing, in principle, a cryo-compressed tank including its peripherals.

First of all, reference is made to the accompanying FIG. 1, which shows in principle a cryo-compressed tank, including its peripheral equipment required for understanding the present invention. In this case, the reference numeral 1 stands for the entire cryo-compressed tank, in which cryogenic hydrogen that serves to supply a consumer (not illustrated), for example, an internal combustion engine and/or a fuel cell of a motor vehicle, can be stored at absolute pressure values of the tank internal pressure in a magnitude of 150 bar or more, but at least under supercritical pressure at 13 bar or more. This cryo-compressed tank 1 consists of a pressure-proof inner tank 1a, inside of which is stored the cryogenic hydrogen, and, furthermore, an insulating layer 1b, which envelops the inner tank 1a and which in essence has a vacuum, as well as an outer shell 1c, enclosing this vacuum.

The inner tank 1a can be filled with cryogenic hydrogen under supercritical pressure by way of a tank filling line 2. The hydrogen can be taken from the inner tank 1a by way of a removal line 3, which empties into a cryo valve unit 4, which is shown only as a rough outline and is not essential for the present explanation. Attached to this valve unit 4 is a first, or rather external, heat exchanger 5, through which are guided, on the one hand, a first heat carrying circuit 15 and secondly a supply line 6, which follows the removal line 3 and which ultimately leads to the aforesaid consumer. The supply line 6 is connected in a heat carrying manner to the first heat carrying circuit 15, so that the hydrogen, conveyed in the supply line 6, is heated in the external heat exchanger 5.

The first external heat exchanger 5 follows a second valve unit 7. The supply line 5 is guided through this second valve unit 7 while at the same time passing through a tank pressure regulating valve 7a and a pressure regulating unit 7b. A so-called branch line 8 branches off of the tank pressure regulating valve 7a. The hydrogen, which was removed from the cryo-compressed tank 1 and heated in the first heat exchanger 5, is fed into a second (internal) heat exchanger 9, provided inside the inner tank 1a of the cryo-compressed tank 1. After flowing through this second heat exchanger 9, which is provided in the cryo-compressed tank 1, this hydrogen is fed over a return line 10 into the supply line 5, downstream of the branching off of the branch line 8. In this case, this return line 10 is guided beforehand through the first external heat exchanger 5, in which the hydrogen, which has cooled down in the second internal heat exchanger 9, is heated again by the heat exchange with the said heat carrying circuit 15. Therefore, the hydrogen, which was conveyed through the branch line 8 and the second internal heat exchanger 9 and the return line 10, acts as the heat carrying medium that serves to heat the hydrogen, stored in the cryo-compressed tank 1. At the same time this temperature increase is controlled by feeding the heat carrying medium to the internal heat exchanger 9 and by the switching strategy of the tank pressure regulating valve 7a, said strategy having already been explained in detail above in conjunction with the description of the figure.

Figure 2:
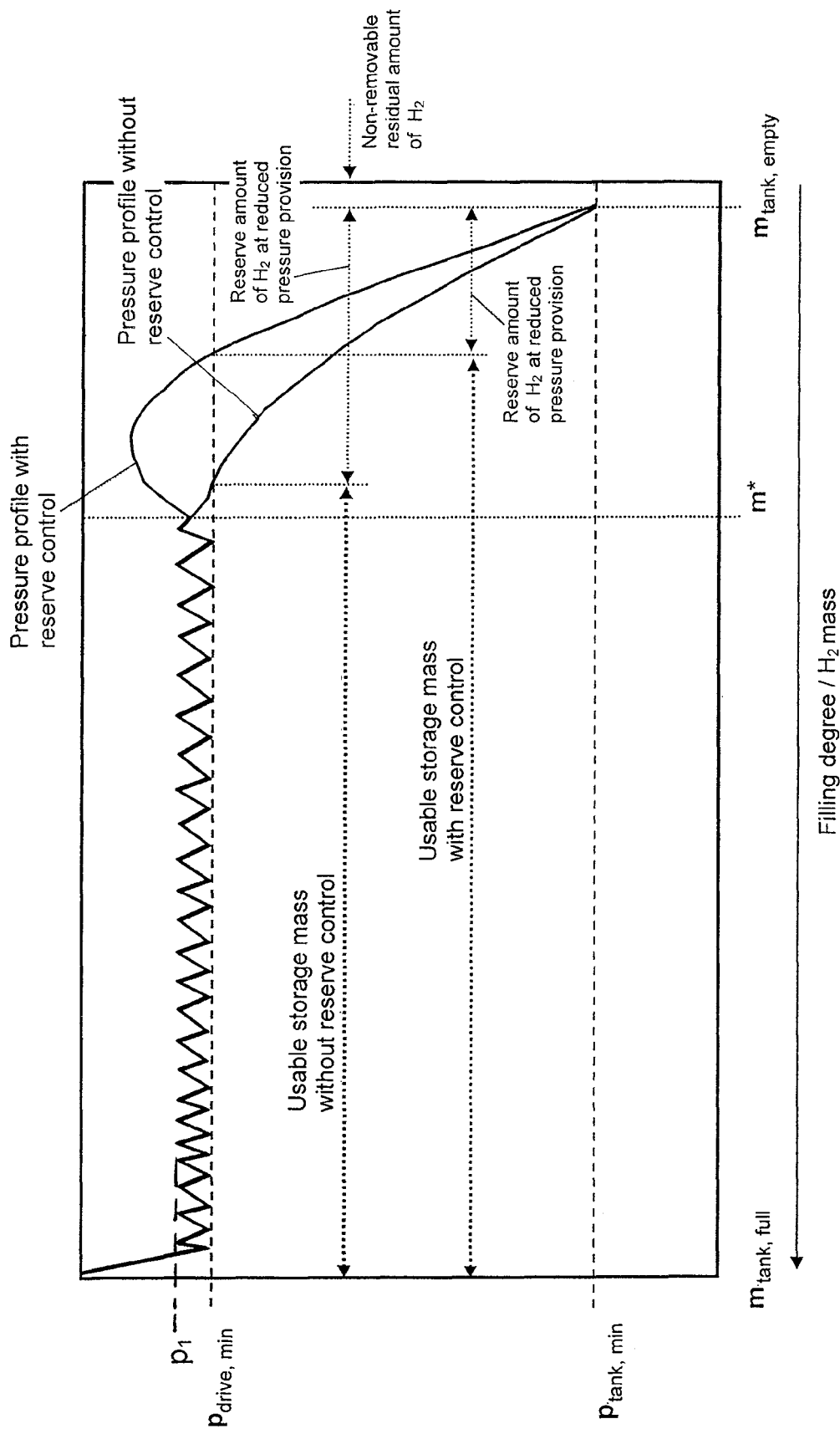
FIG. 2 is a diagram of the tank internal pressure with respect to the filling degree of the cryo-compressed tank.

FIG. 2 shows a diagram, in which the profile of the tank internal pressure, plotted on the ordinate, over the filling degree of the cryo-compressed tank 1 from FIG. 1, more precisely the inner tank 1a of the same, which is plotted on the abscissa, is shown as the mass of stored hydrogen ("$H_2$ mass").

"$p_{tank,min}$" stands for the admitted minimum tank internal pressure (in the inner tank 1a); and "$p_{drive,min}$" stands for the minimum pressure value, which the hydrogen, removed from the cryo-compressed tank 1, has to exhibit in order to be usable in the consumer, in this case an internal combustion engine which acts as the vehicle drive unit, without any operational restrictions of the consumer (i.e., the internal combustion engine). Although the removed hydrogen can still be used at lower pressure values, the consumer is then operable only to a limited degree. In particular, the maximum possible power of the internal combustion engine can no longer be achieved.

"$m_{tank,full}$" stands for a 100% filling degree of the cryo-compressed tank 1, whereas "$m_{tank,empty}$" stands for a minimum filling degree, which under marginal operating conditions cannot be physically undershot. That is, since a non-removable residual amount of hydrogen ($H_2$), which is denoted with these words in FIG. 2, remains in the tank, it is self-evident that the tank cannot be totally emptied.

"m" stands for a partial filling degree of the cryo-compressed tank 1, at which no pressure exceeding a design specific limit value can be generated inside the inner tank 1a of the cryo-compressed tank 1, despite the continuously open tank pressure regulating valve 7a from FIG. 1 and despite the continuous heat input through the tank insulation (=insulating layer 1b of the tank 1) that naturally cannot be totally suppressed.

When the cryo-compressed tank 1 is totally filled, that is, 100% full, the tank exhibits a high internal pressure that is above the pressure value $p_{drive,min}$. On removal of the hydrogen from the cryo-compressed tank 1, the internal pressure in the inner tank 1a naturally decreases, when the tank pressure regulating valve 7a (and, thus, the internal heat exchanger 9, through which there is no flow (see FIG. 1)) is initially closed. When the pressure value $p_{drive,min}$ is reached, a strategy for increasing the internal pressure is initiated, in that, as described above, the then removed and heated hydrogen, acting as the heat carrier, is conveyed in its entirety (that is, not just a portion of the hydrogen stream) for a longer period of time through the second heat exchanger 9, which is arranged inside the cryo-compressed tank 1, by suitably switching the tank pressure regulating valve 7a. When as a result of this strategy the internal pressure $p_1$ has increased somewhat (as the upper tank pressure threshold value for the control unit-induced actuation of the tank pressure regulating valve 7a), then the tank pressure regulating valve 7a is moved again into its original switching state, in which there was no hydrogen flow whatsoever from the supply line 5 into the branch line 8, in order not to allow the internal pressure in the tank to continue to increase. In this closed switching state the tank pressure regulating valve 7a in turn is held over a longer period of time, which significantly exceeds the typical cycle times of a conventional frequency valve, until once again the lower tank pressure threshold value, that is, the pressure value $p_{drive,min}$, is reached.

This process of totally opening and closing the tank pressure regulating valve 7a as a function of the pressure in the inner tank 1a is repeated until the partial filling degree m* is reached. Then the tank pressure regulating valve 7a is opened and/or remains continuously open, that is, for a prolonged period of time, as a result of which on continued removal of the hydrogen from the inner tank 1a the pressure profile, labeled with the words "pressure profile with reserved control," is produced. If, in contrast, the tank pressure regulating valve 7a were to be actuated in accordance with the preceding logic, that is, executed prior to reaching the partial filling degree m*, then the result would be the pressure profile marked with the words "pressure profile without reserve control."

It is clear from FIG. 2 that when the proposed method, which is called herein a reserve control, is implemented in the associated pressure profile (with reserve control), the result is an increase in the tank internal pressure beyond the higher pressure value $p_1$, which is produced by the preceding actuation logic and which is the upper threshold value for regulating the internal pressure of the tank. As a direct comparison of the two pressure profiles with and/or without the reserve control shows, the one without any operational limitation of the consumer, that is, as far as to the final undershooting of the pressure value $p_{drive,min}$ usable amount of hydrogen, which is characterized in FIG. 2 with the words "usable storage mass with and/or without reserve control," is significantly larger with the implementation of the proposed method, that is, with the so-called reserve control, than without the implementation of this proposed method. Of course, when this so-called reserve control strategy is executed, the amount of hydrogen that can be taken from the tank 1 with a pressure value below the value $p_{drive,min}$ and that is characterized with the words "$H_2$ reserve amount at reduced pressure provision" is correspondingly less.

Apart from the advantage described with reference to FIG. 2, the method, which is proposed herein in general, that is, without the so-called reserve control, is characterized by its ease of implementation with negligibly few demands on the implementing control unit and technology and/or on the corresponding components. In particular, the number of switching steps ("open" and/or "closed"), to be executed by the tank pressure regulating valve 7a is significantly smaller than in the case of a continuous pressure regulation on a substantially constant pressure level, which is practiced in the aforementioned "hydrogen 7" vehicle. In the present case, the switching times of the tank pressure regulating valve 7a can be, as a function of the amount of hydrogen that is removed from the inner tank, in a magnitude of 15 minutes and more, thus, significantly above the typical cycle times of a conventional frequency valve, whereas the upper and lower threshold value for actuating the tank pressure regulating valve 7a can differ, for example, by 10 bar and more, that is ($p_1 - p_{drive,min} \geq 10$ bar). In this context it must also be pointed out that this and a plurality of details can be designed so as to deviate from the above embodiment without departing from the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a cryo-compressed tank, in which cryogenic hydrogen for supplying a consumer is storable at a supercritical pressure of 13 bar or more, the method comprising the acts of:

conveying removed hydrogen that has been heated in an external heat exchanger to an in-tank heat exchanger provided in the cryo-compressed tank, through a tank pressure regulating valve and a branch line from the tank pressure regulating valve which branches off of a supply line leading to the consumer in order to compensate for pressure loss resulting from hydrogen removal from the cryo-compressed tank;

introducing the removed hydrogen that has passed through the in-tank heat exchanger into the supply line downstream of the branch line; and either (a) guiding the removed amount of hydrogen that has passed through the external heat exchanger without limitation into the in-tank heat exchanger while the tank pressure regulating valve is completely open, or (b) having no return of the hydrogen that has passed through the external heat exchanger into the in-tank heat exchanger occur at all while the hydrogen passes through the external heat exchanger and then the tank pressure regulating valve to continue downstream in the supply line, wherein the tank pressure regulating valve is completely closed when a pressure in the cryo-compressed tank is above a higher tank pressure threshold value for opening the tank pressure regulating valve and is completely open when the pressure in the cryo-compressed tank is between the higher tank pressure threshold value and a lower tank pressure threshold value corresponding to a minimum desired pressure required by a hydrogen consumer for operation without functional limitation, wherein in the supply line downstream of the return of the removed hydrogen from the in-tank heat exchanger to the supply line, the supply line has a pressure regulating unit configured to supply hydrogen to the consumer at the desired pressure irrespective of changes in pressure in the supply line upstream of the pressure regulating unit caused by switching the tank pressure regulating valve.

2. The operating method according to claim 1, wherein on reaching a partial filling degree of the cryo-compressed tank at which additional heat input through tank insulation may be received without exceeding a predetermined pressure limit value inside the cryo-compressed tank, the tank pressure regulating valve is maintained in the continuously open position.

3. The operating method according to claim 1, wherein the consumer is an internal combustion engine of the motor vehicle.

4. The operating method according to claim 1, wherein the consumer is a fuel cell of a motor vehicle.

* * * * *